United States Patent
Longsworth

(10) Patent No.: US 9,186,601 B2
(45) Date of Patent: Nov. 17, 2015

(54) CRYOPUMP DRAIN AND VENT

(75) Inventor: Ralph Longsworth, Allentown, PA (US)

(73) Assignee: SUMITOMO (SHI) CRYOGENICS OF AMERICA INC., Allentown, PA (US)

( * ) Notice: Subject to any disclaimer, the term of this patent is extended or adjusted under 35 U.S.C. 154(b) by 561 days.

(21) Appl. No.: 13/451,712

(22) Filed: Apr. 20, 2012

(65) Prior Publication Data
US 2013/0276467 A1    Oct. 24, 2013

(51) Int. Cl.
*B01D 8/00* (2006.01)

(52) U.S. Cl.
CPC .......................................... *B01D 8/00* (2013.01)

(58) Field of Classification Search
CPC ...................................................... B01D 8/00
USPC ............................. 62/55.5, 82, 268, 269, 475
See application file for complete search history.

(56) References Cited

U.S. PATENT DOCUMENTS

| | | |
|---|---|---|
| 4,150,549 A | 4/1979 | Longsworth |
| 4,446,702 A | 5/1984 | Peterson et al. |
| 4,449,373 A | 5/1984 | Peterson et al. |
| 4,530,213 A | 7/1985 | Kadi |
| 4,655,046 A | 4/1987 | Eacobacci et al. |
| 4,679,401 A | 7/1987 | Lessard |
| 4,691,534 A | 9/1987 | Lombardini et al. |
| 4,791,791 A | 12/1988 | Flegal et al. |
| 4,966,016 A | 10/1990 | Bartlett |
| 5,056,319 A | 10/1991 | Strasser |
| 5,156,007 A | 10/1992 | Bartlett et al. |
| 5,228,299 A * | 7/1993 | Harrington et al. ............ 62/55.5 |
| 5,301,511 A | 4/1994 | Bartlett et al. |
| 5,333,466 A | 8/1994 | Harrington et al. |
| 5,343,709 A | 9/1994 | Kohler |
| 5,361,588 A | 11/1994 | Asami et al. |
| 5,400,604 A | 3/1995 | Hafner et al. |
| 5,412,952 A | 5/1995 | Ohtani et al. |
| 5,443,548 A | 8/1995 | Saho et al. |
| 5,465,584 A | 11/1995 | Mattern-Klosson et al. |
| 5,542,257 A * | 8/1996 | Mattern-Klosson et al. .. 62/55.5 |
| 5,862,671 A * | 1/1999 | Lessard et al. ................. 62/55.5 |

(Continued)

FOREIGN PATENT DOCUMENTS

| | | |
|---|---|---|
| JP | 6-33874 | 2/1994 |
| JP | 7-502793 | 3/1995 |

(Continued)

OTHER PUBLICATIONS

Longsworth, R.C., and Webber, R.J., "Cryopump vacuum recovery after pumping AR and H2" J. Vac. Sci. Technol. A 9 (5), Sep./Oct. 1991 pp. 2766-2770; in English.

(Continued)

*Primary Examiner* — Emmanuel Duke
(74) *Attorney, Agent, or Firm* — Katten Muchin Rosenman LLP

(57) ABSTRACT

A means of rapidly melting a large quantity of type II cryogen in a cryopump that is configured to contain the liquid in the warm cryopanel with the inlet to the cryopump facing up or sideways, and venting the liquid and gas in a controlled way. Rapid melting is preferably accomplished by flowing a purge gas that will condense on the cryodeposit. By not allowing the liquid to drain onto the vacuum housing the evaporation rate is limited and the maximum pressure in the cryopump can be controlled by the purge gas flow rate.

5 Claims, 4 Drawing Sheets

(56) References Cited

U.S. PATENT DOCUMENTS

| | | |
|---|---|---|
| 5,974,809 A | 11/1999 | Wooster et al. |
| 6,122,921 A | 9/2000 | Brezoczky et al. |
| 6,155,059 A | 12/2000 | Matte et al. |
| 6,230,499 B1 | 5/2001 | Hohne |
| 6,256,997 B1 | 7/2001 | Longsworth |
| 6,263,679 B1 | 7/2001 | Paynting |
| 6,293,109 B1 | 9/2001 | Miyamoto et al. |
| 6,465,584 B1 | 10/2002 | Evens et al. |
| 2001/0025494 A1 | 10/2001 | Okamura et al. |
| 2003/0150220 A1 | 8/2003 | Foster |
| 2005/0011200 A1 | 1/2005 | Longsworth |
| 2008/0184712 A1* | 8/2008 | Longsworth .......... 62/55.5 |

FOREIGN PATENT DOCUMENTS

| | | |
|---|---|---|
| JP | 63-30768 | 2/1998 |
| JP | 10-184540 | 7/1998 |
| WO | 93/15318 | 8/1993 |

OTHER PUBLICATIONS

Longsworth, R.C., and Bonney, G.E., "Cryopump regeneration studies" J. Vac Sci. Technol. vol. 21, No. 4, Nov./Dec. 1982 pp. 1022-1027; in English.

\* cited by examiner

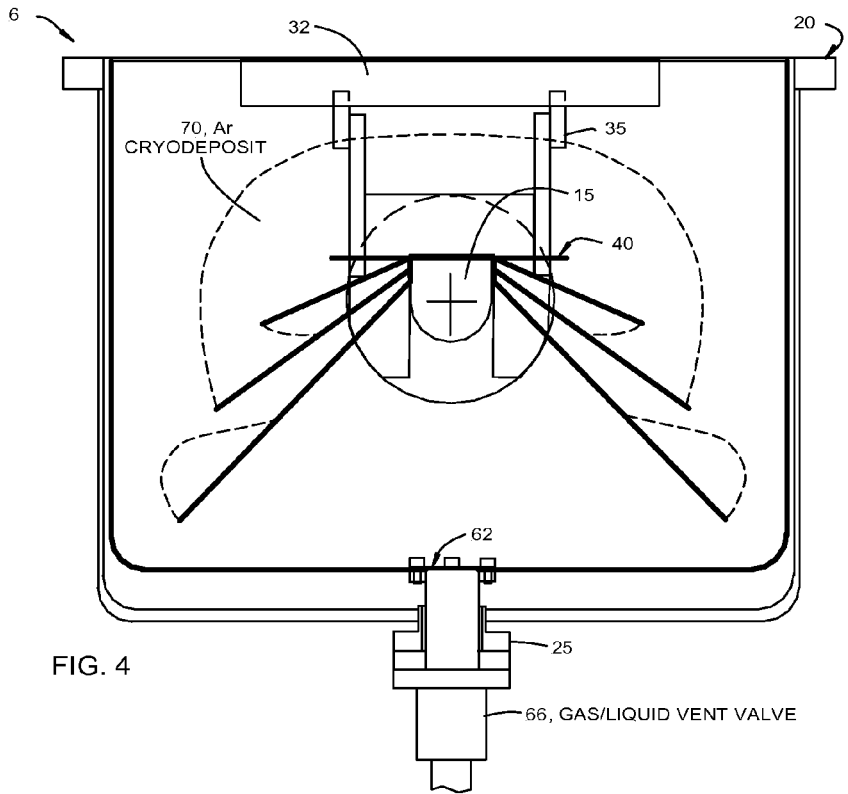
FIG. 4
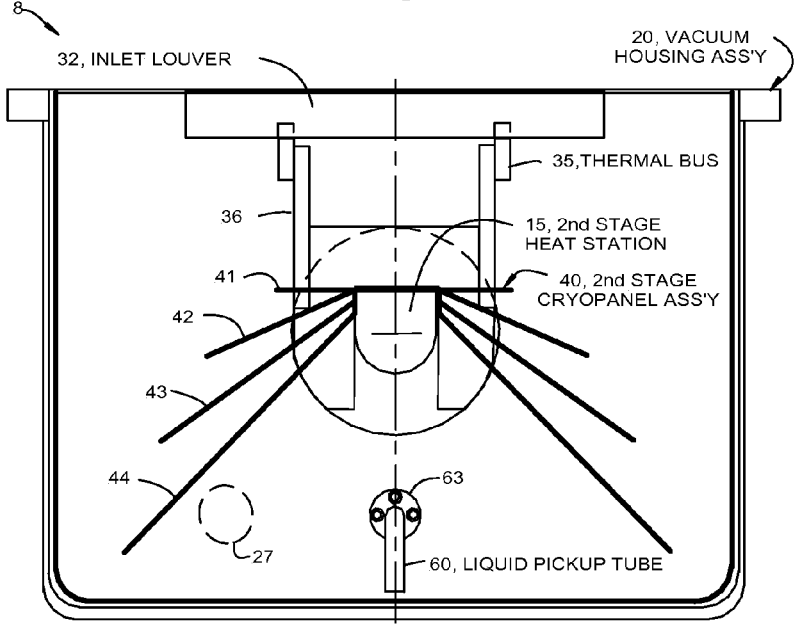
FIG. 3  Section A-A of FIG. 1

CRYOPUMP DRAIN AND VENT

BACKGROUND OF THE INVENTION

The object of the present invention is to provide fast regeneration of a cryopump that is used for sputtering in the semiconductor manufacturing process. Sputtering takes place with a flow of Ar at 100 to 200 scc/m for a period of about one minute, followed by a cessation of Ar flow while the pressure drops to a base pressure of less than $2*10^{-7}$ Torr and loading of a new wafer in about one minute. The throughput of semiconductor wafers depends on a) fast recovery time to base pressure after flowing Ar, b) a lot of cycles between regenerations, and c) fast regeneration; consisting of fast warm up, fast removal of the cryodeposits, and fast cooldown. Since a cryopump removes the gaseous Ar by freezing it on the second stage (cold) cryopanel the pump has to be warmed up periodically (regenerated) to melt and remove the Ar cryodeposit, then cooled back to normal operating temperatures. Other gases such as water and hydrogen that accumulate in much smaller quantities are also removed in the regeneration process. Two stage G-M refrigerators, which are presently being used to cool cryopumps, cool a first stage cryopanel at 50 to 100 K and a second stage cryopanel at about 15 K. The expander is usually configured as a stepped cylinder with a valve assembly at the warm end of the first stage, a first stage cold station (at 50 to 100 K) at the transition from the larger diameter first stage to the smaller diameter second stage, and a second stage cold station (at about 15 K) at the far end. An example of an expander that is used in cryopumps as described in this application is found in U.S. Pat. No. 6,256,997.

Cryopumps are made with the plane of the inlet perpendicular to the axis of the expander cylinder, "in line", or parallel to the axis of the cylinder, "low profile". Both types of cryopumps are used for sputtering but the low profile type is preferred because it is more compact when mounted under or on the side of the semi-conductor process chamber. A common size cryopump for this application has a 300 mm ID inlet port Cryopumps operate equally well in all orientations in terms of freezing gases but during regeneration the melting cryodeposits can flow out in different directions depending on the orientation and the design of the cryopump.

U.S. Pat. No. 4,530,213 describes a cryopump that uses a two stage G-M refrigerator to cool two cup shaped axi-symetric cryopanels. The first stage cools an inlet (warm) panel and inlet louver that pumps Group I gases, e.g. $H_2O$ and $CO_2$, and blocks a significant amount of radiation from reaching the second stage (cold) panel, but allows Group II gases, e.g. Ar and $N_2$, and Group III gases, e.g. $H_2$ and He, to pass through it. The Group II gases freeze on the front side of the cold panel and Group III gases are adsorbed in an adsorbent on the backside of the cold panel. U.S. Pat. No. 4,530,213 describes a cold panel design that consists of a series of concentric cones of increasing diameter from the inlet region to the back of the housing. This design is better for sputtering because there is more room for the Ar to collect and there is more surface area on which the Ar is distributed. Because solid Ar has a high thermal conductivity it is possible to have cryodeposits build up to be 2 to 3 cm thick before recovery time to a given pressure degrades. For a typical 300 mm ID cryopump this might be, about 3,000 SL of Ar having a weight of about 5 kg. The object of this invention is to minimize the time it takes to safely remove this large amount of cryogen from the pump.

The adsorbent used in most cryopumps is charcoal which can shed small particles. All cryopumps have a vent valve (pressure relief valve) that opens typically at about 20 kPa. It is standard practice to put a screen filter in front of the vent valve to prevent particulates from getting into the valve and preventing the vent valve from resealing after regeneration. U.S. Pat. No. 4,655,046 has a good description of the design parameters for a good screen filter.

U.S. Pat. No. 5,400,604 describes a cryopump that has a means of removing liquid and gas during regeneration and describes several methods for regenerating the cryopump. The cryopump is an in line type with inlet facing up and, as is typical for most cryopump applications, can be isolated from the process vacuum chamber by a gate valve. Liquids can accumulate in the bottom of the warm panel and flow out through a vent line when the pressure is sufficiently high The methods for removing the cryodeposits all include closing the gate valve followed by heating of the cryodeposit to melt it and increasing the pressure. A heater on the cold cryopanel is used to melt the cryodeposit. U.S. Pat. No. 5,465,584 is a continuation of the '604 patent and includes a heater on the valve that controls the flow from the vent line.

U.S. Pat. No. 5,228,299 describes another in line cryopump with the inlet facing up and having melted cryodeposit raining down on the bottom of the warm panel. The bottom is sloped down to an exit hole below which is a cone with filters connected to a vent port that releases both liquid and gas to an external vent line. The design also includes a purge gas port located in the bottom of the warm panel and directed to blow liquid toward the exit hole. Heat to melt the cryodeposit can come from the purge gas with or without a heater. The top of the cone that collects the liquid flowing out of the exit hole in the warm panel is not in contact with the warm panel so liquid can spill over the top and be vaporized by contact with the vacuum housing in the event that the filter becomes clogged. U.S. Pat. No. 5,333,466 is a division of U.S. Pat. No. 5,228,299 that has claims about the filter.

U.S. Pat. No. 4,655,046 describes an in line cryopump with the inlet facing up having a vent port mounted in the bottom of the vacuum housing with a standpipe containing a filter screen to prevent particulates from preventing resealing of the relief valve. U.S. Pat. No. 5,974,809 describes a similar screen arrangement protecting the relief valve in a low profile cryopump, the inlet also facing up. Both of these are silent on the means of heating the cryodeposit other than having the pump warm slowly as the pressure in the pump rises and convective heating takes place between the vacuum housing and the cryopanels. Many cryopumps have holes in the bottom of the warm panel that allow melted cryogens to come in contact with the vacuum housing and vaporize rapidly.

If the cryopumps described in U.S. Pat. Nos. 5,400,604, 5,465,584, 5,228,299, 5,333,466, 5,974,809, and 4,655,046 were all oriented with the inlet in a vertical plane the melted cryogen would spill onto the vacuum housing and be rapidly vaporized. This chilling of one side of the vacuum housing can cause problems. This problem is addressed in U.S. Pat. No. 5,542,257 by two different means. The first is to have the melted cryogen spill out the front (inlet) end of the warm panel into a cup shaped collector in the vacuum housing flange then through an external vent valve. The second is to have the melted cryogen collect in the bottom of the warm flange which has a dam at the front lip or is shaped to have the liquid collect in the back of the warm panel and then have it blown out through a vent tube and a vent valve which can be oriented any place on the housing inlet flange. There is no description of a method of melting the cryodeposit but there is a heater in the bottom of the warm panel to vaporize the melted cryodeposit. This undoubtedly increases the pressure enough to force liquid out through the vent tube with the gas.

The main problem with this design is that the vent ports as described are too small to allow a high flow rate of venting gas which is necessary for a fast warm up of the cryopump. A vent tube that is large enough for gas would have to be too large to carry much liquid to the top of the cryopump.

Warming up the cryopanels is usually done by a heater on the cold panel, or a blanket heater on the outside of the vacuum housing. Since some of the gases that have been cryopumped can be combustible it is preferred to have the heater on the outside of the vacuum housing. Regeneration usually starts by closing the inlet valve to isolate the cryopump from the process chamber, followed by stopping the cryopump, turning on heaters, starting a flow of purge gas, usually N2, to remove combustible gases, warming, melting, and usually vaporizing Group II cryodeposits, venting the liquids and gases at about 15 kPa above atmospheric pressure, continuing to warm the cryopump to room temperature, stopping the flow of purge gas, then evacuating the cryopump to remove Group I gases and gases that are adsorbed in the charcoal. Once the cryopump is evacuated the refrigerator is turned back on and the cryopump cools to its normal operating temperatures.

Warming 5 kg of solid Ar from 20 K, melting it at 84 K, then warming it to 88 K, where the pressure is high enough for the liquid to be vented, requires 58 W Hrs of heat, 300 W for 11.6 min. Warming, melting and vaporizing 5 kg of Ar requires 283 W Hrs of heat, 300 W for 56 min. Most cryopumps now in use allow the liquid to drain onto the vacuum housing which has a lot of thermal mass and rapidly vaporizes the cryogen. This causes a spike in the pressure. Vent valves for the gas are usually located at a convenient point on the vacuum housing as shown in U.S. Pat. No. 5,974,809.

SUMMARY OF THE INVENTION

The present invention applies to a means of rapidly melting a large quantity of type II cryogen in a cryopump that is configured to contain the liquid in the warm cryopanel with the inlet to the cryopump facing up or sideways, and venting the liquid and gas in a controlled way. Rapid melting is preferably accomplished by flowing a purge gas that will condense on the cryodeposit. By not allowing the liquid to drain onto the vacuum housing the evaporation rate is limited and the maximum pressure in the cryopump can be controlled by the purge gas flow rate.

BRIEF DESCRIPTION OF THE DRAWINGS

FIG. 3 is a cross section view of cryopump 8 along plane A-A shown in FIG. 1,

FIG. 4 is a cross section view of cryopump 6 which is identical to FIG. 3 except that it has a different vent valve arrangement.

The same or equivalent parts in each drawing are identified by the same part number.

DETAILED DESCRIPTION OF THE INVENTION

Figure 1:
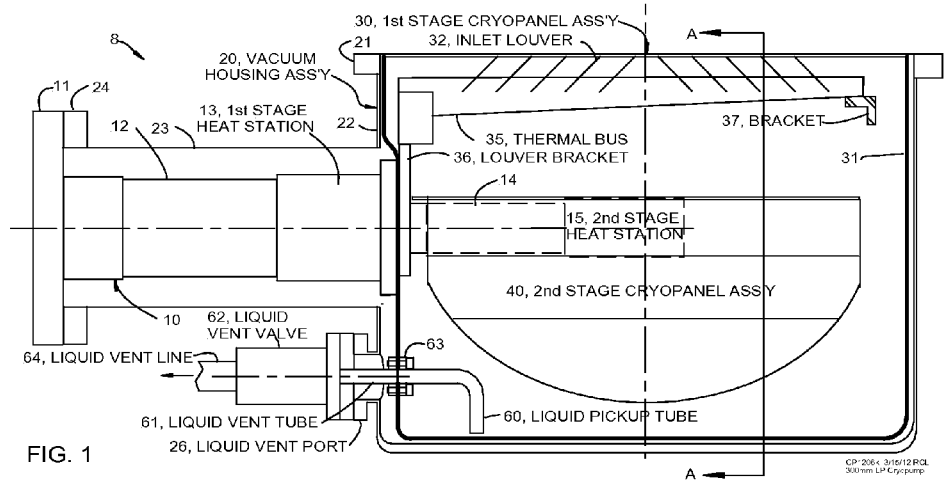
FIG. 1 is a cross section of a side view of low profile cryopump 8 which has a 300 mm diameter inlet that is facing up. The expander drive mechanism is not shown in FIG. 1 but can be seen in U.S. Pat. No. 5,361,588.

The side view cross section of low profile cryopump assembly 8 shown in FIG. 1 shows the main components including expander cylinder assembly 10, vacuum housing assembly 20, $1^{st}$ stage cryopanel assembly 30, $2^{nd}$ stage cryopanel assembly 40, and the liquid vent components. Expander cylinder assembly 10 consists of warm flange 11, $1^{st}$ stage cylinder 12, $1^{st}$ stage heat station 13, $2^{nd}$ stage cylinder 14, and $2^{nd}$ stage heat station 15. Vacuum housing assembly 20 consists of inlet mounting flange 21, cryopanel housing 22, cylinder housing 23, expander mounting flange 24, and liquid vent port 26. Not shown are mounting ports on cylinder housing 23 that are generally standard for cryopumps to mount a pressure gauge, temperature sensors, purge gas input, and an evacuation port. The $1^{st}$ stage cryopanel assembly 30 consists of radiation shield 31 (frequently referred to as the warm panel), inlet louver 32, thermal bus 35, thermal bracket 36, and louver support bracket 37. The $2^{nd}$ stage cryopanel assembly 40 (cold panel) consists of cryopanels 41, 42, 43, etc. which are shown in FIG. 3. The liquid vent components include liquid pickup tube 60, liquid vent tube 61, coupling 63, liquid vent valve 62, and liquid vent line 64.

Figure 2:
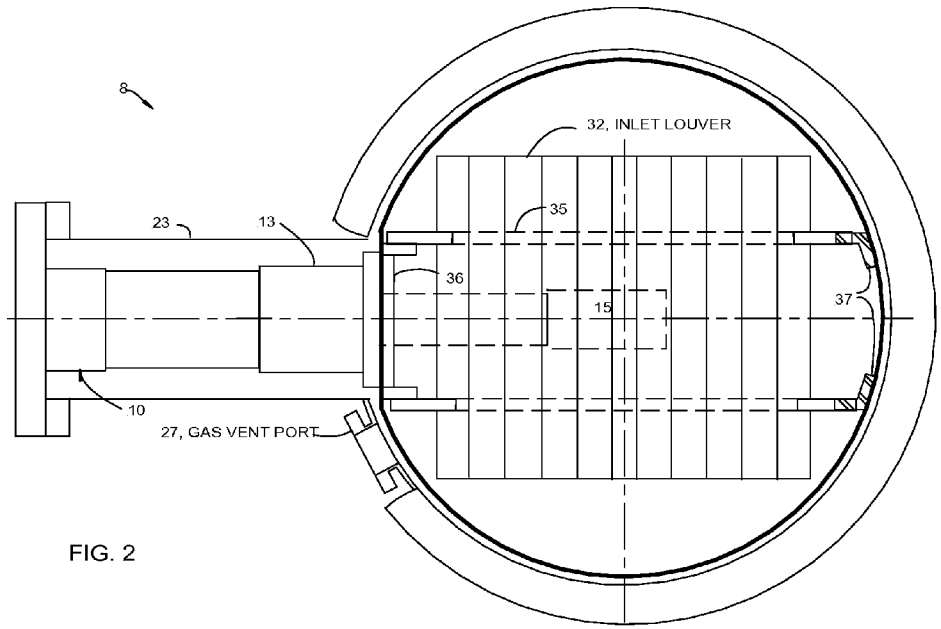
FIG. 2 is a top view of cryopump 8 without the second stage cryopanel assembly.

FIG. 2 is a top view of cryopump 8 without the second stage cryopanel assembly. Liquid vent port 26 is hidden below expander assembly 10 but gas vent port 27 is shown offset from liquid port 26, as shown in FIG. 3. These ports can be any place on the vacuum housing and gas vent port 27 could be on sleeve 23. When the cryopump is assembled, warm panel 31 is inserted in vacuum housing 20 then liquid pickup tube 60 is connected to liquid vent tube 61 by coupling 63 which has a seal that prevents liquid from getting into the space between warm panel 31 and housing 22. Expander assembly 10 is then inserted and warm panel 31 is attached to $1^{st}$ stage heat station 13 along with louver bracket 36 such that a leak tight joint is obtained. Second stage cryopanel assembly 40 is then attached followed by inlet louver 32 which is soldered to thermal bus 35. Cryopump 8 is shown with the inlet facing up but it could be tilted at an angle of up to about 45° as long as liquid pickup tube 60 is located at the lowest point in warm panel 31. The maximum tilt angle is determined by the criteria that all of the melted cryogen be contained within warm cryopanel 31.

Figure 6:
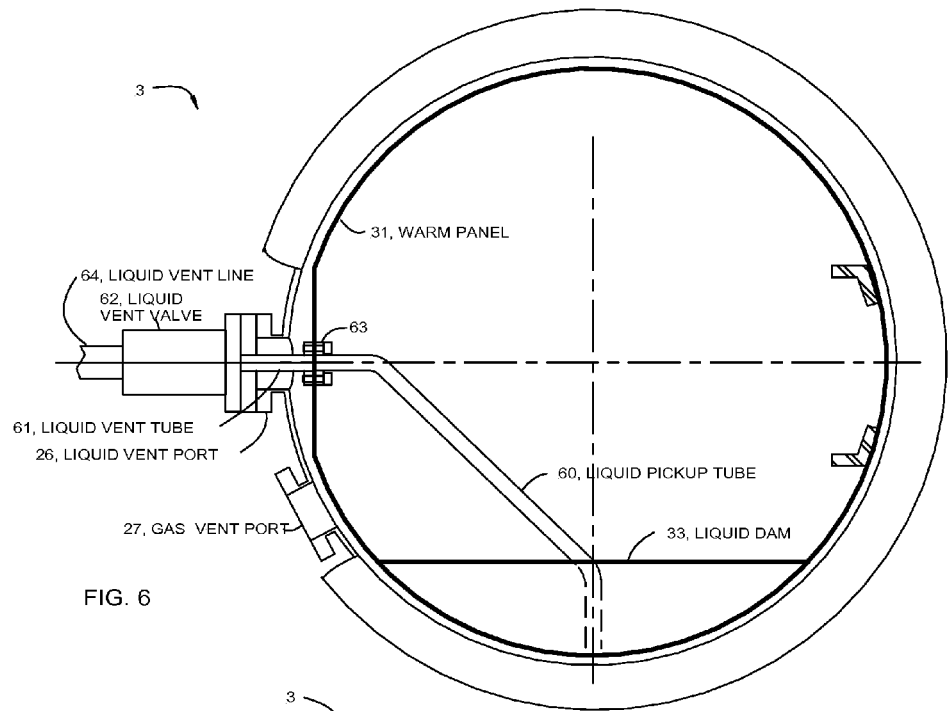
FIG. 6 is a view of cryopump 3 from the front with the cryopanels and expander removed.
Figure 5:
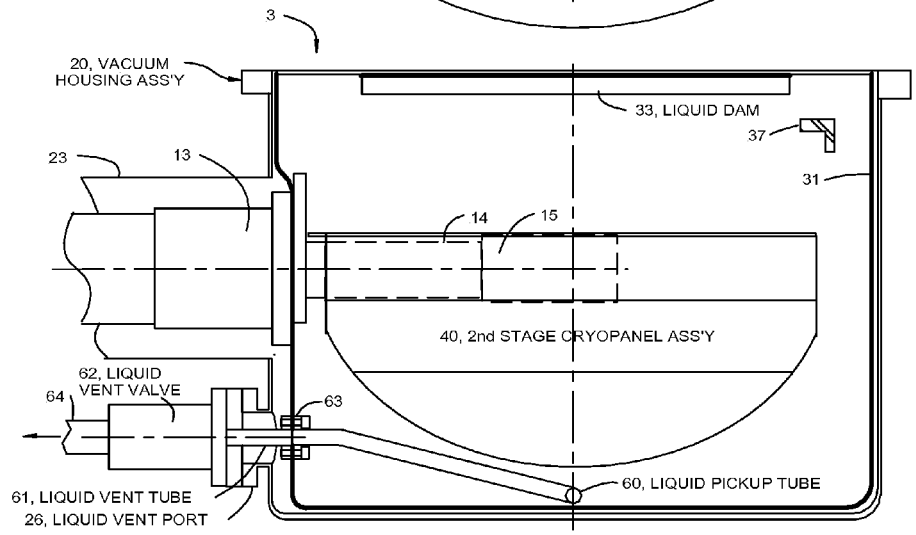
FIG. 5 is a cross section view of cryopump 3 which is similar to cryopump 8 except that it is configured to be mounted with the inlet facing sideways.

FIG. 4 is a cross section view of low profile cryopump 6 with the inlet port facing up and having a single vent valve, 66, for liquid and gas. The inlet for vent valve 66 is sealed at the connection to warm panel 31 by flange 62. FIG. 4 shows an approximate outline of the solid Ar on the $2^{nd}$ stage cryopanels when the cryopump is full. In the orientation with the inlet facing up all of the melted cryodeposit can be contained in the bottom of warm panel 31 and a single vent valve that is large enough for both liquid and gas can be used. Vent valve 66 would typically open at about 15 kPa above atmospheric pressure, as would liquid vent valve 62, while the gas vent valve connected to port 27 would open at about 25 kPA FIGS. 5 and 6 show low profile cryopump 3 which is similar to cryopump 8 except that it is configured to be mounted with the inlet facing sideways. It has two vent ports, 26 for liquid and 27 for gas. Liquid dam 33 is attached at the time the cryopump is installed such that it is at the lowest point in warm panel 31. The attachment is such that liquid can not leak through it. Similarly liquid pick up tube 60 has its inlet at the lowest point in warm panel 31. Liquid dam 33 is drawn to scale for a 300 mm cryopump at a height that will block 10% of the flow of Group II and III gases and contain about 35% of the 5 kg of Ar that can freeze in the cryopump. The height of liquid dam 33 is about 15% of the diameter of warm panel 31.

Figure 7:
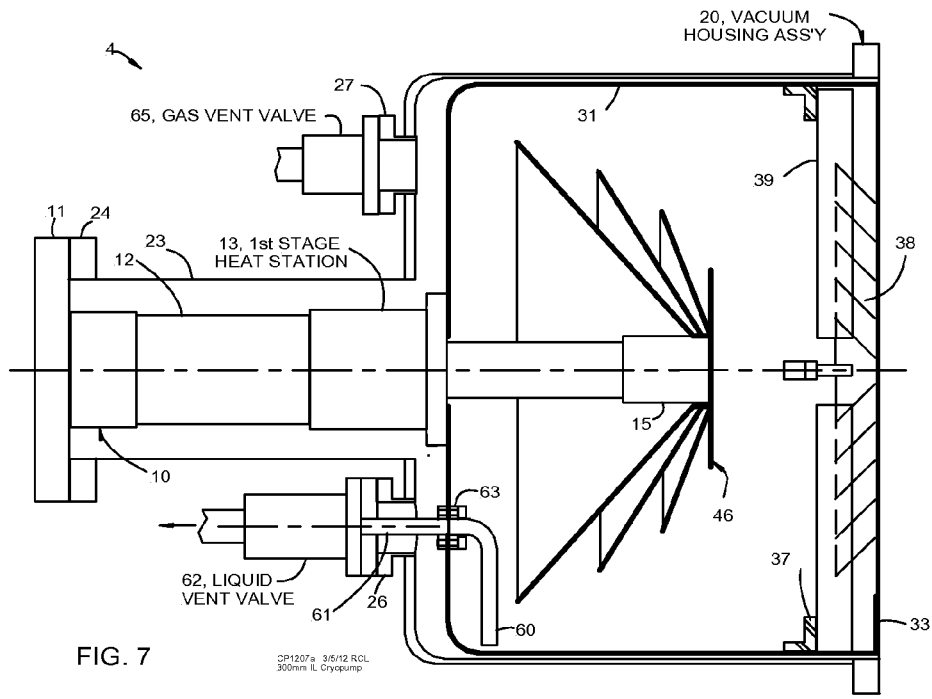
FIG. 7 is a cross section of a side view of in line cryopump 4 which has a 300 mm diameter inlet that is facing sideways.
Figure 8:
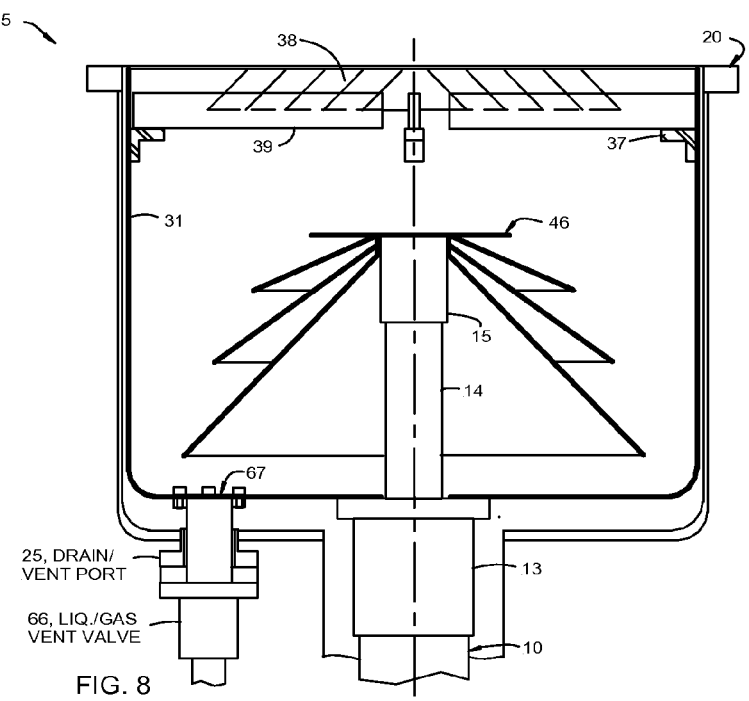
FIG. 8 is a cross section of a side view of in line cryopump 5 which has a 300 mm diameter inlet that is facing up.

FIGS. 7 and 8 illustrate that the same features that have been described for low profile cryopumps can be applied to in line cryopumps. Both cryopumps, 4 and 5, are shown having conical cold panel assemblies 46, and conical inlet louvers 38. FIG. 7 is a cross section of a side view of in line cryopump 4 which has a 300 mm diameter inlet that is facing sideways, similar to cryopump 3 shown in FIGS. 5 and 6. Liquid vent port 26 and gas vent port 27 are shown on the backside of vacuum housing assembly 20. Cryopump 5 shown in FIG. 8 is similar to cryopump 6 shown in FIG. 4 in that it has a single vent port 25 and gas/liquid vent valve 66 with the inlet sealed to the bottom of the warm cryopanel by fitting 62.

The features in the cryopumps that have been described which allow the removal of melted cryogen without having it come in contact with the vacuum housing when the cryopump has the inlet facing up or sideways are necessary for the method of fast removal of the cryogens that is the subject of this invention. TABLE 1 is a list of the properties of Ar and $N_2$ that help to explain the methods and benefits of a new procedure for removing cryodeposits faster than previous methods.

TABLE 1

Selected Properties of Argon and Nitrogen

|  | Gas | |
| --- | --- | --- |
|  | Argon | Nitrogen |
| Triple Point (TP) Temperature - K | 83.8 | 63.1 |
| Triple Point Pressuree - kPa | 68.9 | 12.5 |
| Normal Boiling Point (NBP) - K | 87.3 | 77.4 |
| Heat to warm to TP from 15 K - J/g | 10 | 20 |
| Heat to melt solid and warm to NBP - J/g | 32 | 54 |
| Heat to evaporate liquid at NBP - J/g | 161.9 | 199.3 |
| Heat to warm gas to 300 K - J/g | 112 | 233 |
| Density of liquid at NBP - g/L | 1,393.9 | 807.3 |
| Density at 300 K, 1 Bar - g/L | 1.624 | 1.042 |
| Ar @ 300 K needed to melt 1 kg - L | 95 (1) | 149 (2) |
| $N_2$ @ 300 K needed to melt 1 kg - L | 177 (3) | 164 (1) |

Notes;
(1) - Purge gas condenses
(2) - Purge gas will freeze and form small crystals
(3) - $N_2$ Purge gas will not condense to melt Ar First it is noted that a cryodeposit of Ar at 15 to 20 K has to warm to 84 K before it starts to melt, and the partial pressure of Ar in the cryopump will be 69.9 kPa, which is below normal atmospheric pressure at sea level of 101 kPa. It takes about 42 J/g to warm solid Ar to 84 K, melt it and then warm it to 88 K where the pressure is high enough for it to vent through a relief valve which typically opens with a pressure difference of about 15 kPa. The preferred method to rapidly melt the Ar cryodeposit is to use Ar as a purge gas because the Ar purge will condense. If sufficient amounts of $H_2$ and $N_2$ evolve to raise the total pressure above atmospheric pressure then they will be vented. For 5 kg of solid Ar at 20 K, the 58 W hrs of heat needed to melt it can be supplied by 475 L of Ar or 885 L of $N_2$ at 300 K, 101 kPa. While Ar condenses on the cryodeposit gas flows towards the cryodeposit but not away from it. $N_2$ transfers heat by convection from the gas which is a slower process. Ar is thus a better purge gas than $N_2$ because of the heat transfer process and because it takes less gas.

Five kg of Ar has a volume of 3.7 L as a liquid. This can all be contained in the bottom of warm panel 31 when the inlet is facing up or tilted up to about 45° and then vented when the pressure is high enough to open the vent valve(s). A cryopump with the inlet facing sideways will have a dam that can be sized to hold about a quarter of the liquid Ar. This Ar can be removed in steps by flowing about 100 L of Ar followed by about 15 L of $N_2$, to raise the total pressure above atmospheric pressure and venting the liquid, then repeating this sequence for a total of about four times. It is assumed that the $N_2$ purge is cooled to 90 K. When the Ar purge is resumed it will be partially blocked by the $N_2$ from reaching the solid Ar and the pressure will rise, thus venting $N_2$ until it becomes dilute enough for the Ar to condense at the rate at which it is entering the cryopump.

A cryopump that can hold 5 kg of solid Ar can only hold about 3 kg of solid $N_2$ because of the difference in density. A purge with $N_2$ will condense on the solid at the relatively low pressure of about 13 kPa. It would take about 60 L of He to remove partially melted $N_2$. Ar can also be used as a purge gas. It will freeze when it comes in contact with the solid $N_2$ and collect in the liquid $N_2$ as fine crystals. After melting, the liquid $N_2$ will warm until the pressure is high enough for it to vent.

By containing the liquid within the warm panel the heat flow rate to the cryogen from the purge gas is much greater than by conduction from the housing. The rapid boiling of the liquid cryogen spilling onto the vacuum housing and the attendant pressure spike are avoided and the venting is controlled by the flow rate of the purge gas. While the cryopump described in this invention is focused on a 300 mm ID pump for sputtering, the basic concepts of having a liquid drain system that works in both the horizontal and vertical orientations can be applied to other size housings and other applications.

What is claimed is:

1. A method of removing cryodeposits from a second stage cryopanel assembly,
    the second stage cryopanel assembly being contained in an interior space disposed within a first stage cryopanel assembly in a cryopump attached to a vacuum chamber,
    the cryodeposits comprising group II cryogens,
    the first stage cryopanel assembly comprising an inlet to the interior space, the inlet facing between up and sideways;
the method comprising the steps of:
    (a) orienting a tube that is connected to a first vent valve to remove from the lowest point in the first stage cryopanel assembly a first and a second liquid waste;
    (b) isolating the cryopump from the vacuum chamber;
    (c) stopping cryogenic refrigeration operation of the cryopump;
    (d) introducing a purge gas and a second gas having a lower normal boiling point than the purge gas, the purge gas being selected from group II cryogens;
    (e) melting the cryodeposits with the purge gas into a first liquid waste while the purge gas condensing into a second liquid waste by the cryodeposit;
    (f) containing the first liquid waste and the second liquid waste within the first stage cryopanel;
    (g) increasing a pressure in the interior space by introducing more second gas; and
    (h) removing from the cryopump the first liquid waste, the second liquid gas, and the second gas through the tube into the first vent valve, and removing from the cryopump only the uncondensed purge gas through a second vent valve, wherein the first vent valve opens automatically at a first pressure above atmospheric pressure and the second vent valve opens automatically at a pressure higher than the first pressure.

2. The method of claim 1, wherein when a cryodeposit is partially melted, the following steps are performed
   (i) stopping a flow of the purge gas,
   (j) collecting in the interior space the first liquid waste and the second liquid waste;
   (k) introducing into the interior space enough second gas to force the first liquid waste and the second liquid waste through the first vent valve,
   (l) repeating steps (i)-(k) until all of the cryodeposit is removed from the second stage cryopanel assembly.

3. The method of claim 1, wherein by controlling a flow rate of the purge gas and the second gas into the interior the maximum pressure in said cryopump is controlled.

4. A method of removing at least one cryodeposit from a second stage cryopanel assembly,
   the second stage cryopanel assembly being contained in an interior space disposed within a first stage cryopanel assembly in a cryopump attached to a vacuum chamber, the at least one cryodeposit comprising at least one group II cryogen, the first stage cryopanel assembly comprising an inlet to the interior space, the inlet facing between up and sideways;
   the method comprising the steps of:
      (a) orienting a tube that is connected to a first vent valve to remove from the lowest point in the first stage cryopanel assembly a first and a second liquid waste;
      (b) isolating the cryopump from the vacuum chamber;
      (c) stopping cryogenic refrigeration operation of the cryopump;
      (d) introducing a purge gas, the purge gas being selected from group II cryogens;
      (e) melting the at least one cryodeposit with the purge gas into a first liquid waste while the purge gas condenses into a second liquid waste by the at least one cryodeposit;
      (f) containing the first liquid waste and the second liquid waste within the first stage cryopanel;
      (g) increasing a pressure in the interior space by introducing one of the same purge gas and a second gas having a lower normal boiling point than the purge gas; and
      (h) removing from the cryopump the first liquid waste, the second liquid waste, and a partial amount of purge gas through the tube into the first vent valve, and removing from the cryopump a balance of the gas in the cryopump through a second vent valve;
   wherein the first vent valve opens automatically at a first pressure above atmospheric pressure and the second vent valve opens automatically at a pressure higher than the first pressure.

5. The method of claim 4, wherein when the at least one cryodeposit is partially melted, the following steps are performed
   (i) stopping a flow of the purge gas,
   (j) collecting in the interior space the first liquid waste and the second liquid waste;
   (k) introducing into the interior space enough second gas to force the first liquid waste and the second liquid waste through the first vent valve,
   (l) repeating steps (i)-(k) until all of the at least one cryodeposit is removed from the second stage cryopanel assembly.

* * * * *